United States Patent
Keats et al.

(10) Patent No.: US 6,738,828 B1
(45) Date of Patent: May 18, 2004

(54) NAME RESOLUTION PROTOCOL, SYSTEM AND METHOD FOR RESOLVING A FLAT NAME SPACE TO AN ADDRESS SPACE

(75) Inventors: Bruce D. Keats, Kanata (CA); Peter J. Barry, Kilmore (IE); Trevor D. Corkum, Mahone Bay (CA)

(73) Assignee: Nortel Networks Limited, St. Laurent (CA)

(*) Notice: Subject to any disclaimer, the term of this patent is extended or adjusted under 35 U.S.C. 154(b) by 733 days.

(21) Appl. No.: 09/611,943

(22) Filed: Jul. 6, 2000

(51) Int. Cl.[7] .............................................. G06F 15/16
(52) U.S. Cl. .................. 709/245; 709/227; 709/228; 709/238; 709/239; 709/204; 709/205; 370/354; 370/351; 370/352; 370/353; 370/475
(58) Field of Search ................................ 709/227–229, 709/245, 204, 205, 238–239; 370/270, 264, 257, 475, 465–466, 351–354, 401–402

(56) References Cited

U.S. PATENT DOCUMENTS

| | | | | |
|---|---|---|---|---|
| 5,278,829 A | * | 1/1994 | Dunlap | ........................ 370/475 |
| 5,777,989 A | * | 7/1998 | McGarvey | ................... 370/254 |
| 6,055,236 A | * | 4/2000 | Nessett et al. | ............... 370/389 |

OTHER PUBLICATIONS

IETF RFC 768, "User Datagram Protocol", J. Postel, ISI, http://www.ieft.org/rfc/rfc0768.txt?number=768, dated Aug. 28, 1980, printed on Oct. 26, 2000, p. 1.

IETF RFC 791, "Internet Protocol DARPA Internet Program Protocol Specification", http://www.ieft.org/rfc/rfc0791.txt?number=791, dated Sep. 1981, printed on Oct. 26, 2000, p. 1.

IETF RFC 792, "Internet Control Message Protocol DARPA Internet Program Protocol Specification", J. Postel, ISI, http://www.ieft.org/rfc/rfc0792.txt?number=792, dated Sep. 1981, printed on Oct. 26, 2000, p. 1.

IEFT RFC 793, "Transmission Control Protocol DARPA Internet Program Protocol Specification", http://www.ieft.org/rfc/rfc0793.txt?number=793, dated Sep. 1981, printed on Oct. 26, 2000, p. 1.

(List continued on next page.)

*Primary Examiner*—Robert B. Harrell (57) ABSTRACT

Networks, network elements and methods providing a name resolution protocol which performs name resolution from a flat name space, such as the TL1 name space, to an address space, such as the IP address space are provided. Request functionality involves processing a requested name by determining if the requested name is the local name or a name of a previously resolved name-to-address mapping, and if not by sending a request message to a group of network elements which have joined the group, the request message containing the requested name for which a corresponding address is required. The group of addresses might for example be a multicast group of IP addresses. The reporting functionality involves responding to requests generated as outlined above and consists of joining a group of addresses, and processing the request message containing a requested name for which a corresponding address is required by comparing the requested name with the local name, and if there is a match, to reply with a response message specifying the local address. In embodiments employing the IP address space, the network elements have a stack interface between IP packets and physical layer frames which might for example be SONET frames. The stack interface might for example be adapted to insert the IP packets in a channel defined by predetermined byte locations in the physical layer frames. In the event the physical layer frames are SONET frames, such predetermined byte locations might for example be SONET D1 to D12 overhead bytes.

46 Claims, 9 Drawing Sheets

OTHER PUBLICATIONS

IEFT RFC 826, "An Ethernet Address Resolution Protocol—or —Converting Network Protocol Addresses to 48.bit Ethernet Address for Transmission on Ethernet Hardware", David C. Plummer, (DCP@MIT–MC), http://www.ieft.org/rfc/rfc0826.txt?number=826, dated Nov. 1982, printed on Oct. 26, 2000, p. 1.

IEFT RFC 903, "A Reverse Address Resolution Protocol", Finlayson, Mann, Mogul, Theimer, Stanford University, http://www.ieft.org/rfc/rfc0903.txt?number=903, dated Jun. 1984, printed on Oct. 26, 2000, p. 1.

IEFT RFC 1112, "Host Extensions for IP Multicasting", S. Deering, Stanford University, http://www.ieft.org/rfc/rfc1112.txt?number=1112, dated Aug. 1989, printed on Oct. 26, 2000, p. 1.

IEFT RFC 1700, "Assigned Numbers", J. Reynolds, J. Postel, ISI, http://www.ieft.org/rfc/rfc1700.txt?number=1700, dated Oct. 1994, printed on Oct. 26, 2000, p. 1.

IEFT RFC 2131, "Dynamic Host Configuration Protocol", R. Droms, Bucknell University, http://www.ieft.org/rfc/rfc2131.txt?number=2131, dated Mar. 1997, printed on Oct. 26, 2000, p. 1.

IEFT RFC 2464, "Transmission of IPv6 Packets over Ethernet Networks", M. Crawford, Fermilab, http://www.ieft.org/rfc/rfc2464.txt?number=2464, dated Dec. 1998, printed on Oct. 26, 2000, p. 1.

* cited by examiner

TIP REQUEST EXAMPLE

| BYTE 0 | BYTE 1 | BYTE 2 | BYTE 3 | |
|---|---|---|---|---|
| \multicolumn{4}{c}{IP HEADER} | |
| \multicolumn{4}{c}{UDP HEADER} | |
| 01 | 01 | 51 | 57 | VERSION=1, COMMAND MAGIC COOKIE=5157, =1 |
| 00 | 00 | 01 | 2C | TTL=300 |
| 00 | 00 | 15 | 83 | SEQUENCE # = 5507 |
| 14 | 00 | 00 | 00 | OrigTIDLen=20 |
| 41 | 42 | 43 | 44 | |
| 45 | 46 | 47 | 48 | |
| 49 | 4A | 4B | 4C | Originator's TID ="ABCDEFGHIJKLMNOPQRST" |
| 4D | 4E | 4F | 50 | |
| 51 | 52 | 53 | 54 | |
| 04 | 08 | 00 | 00 | OrigAddrLen=4; Originator's Address Type=2048 |
| 2F | 7C | 80 | 87 | Originator's Address=47.124.128.135 |
| 04 | 00 | 00 | 00 | ReqTIDLen=4 |
| 55 | 56 | 57 | 58 | Requested TID="UVWX" |
| 00 | 08 | 00 | 00 | ReqAddrLen=0 ReqAddrType =2048 |
| 00 | 00 | 00 | 00 | OPTION LENGTH=0 |

FIG. 5B

TIP RESPONSE EXAMPLE

| BYTE 0 | BYTE 1 | BYTE 2 | BYTE 3 | |
|---|---|---|---|---|
| \multicolumn{4}{c}{IP HEADER} | |
| \multicolumn{4}{c}{UDP HEADER} | |
| 01 | 01 | 51 | 57 | VERSION = 1; COMMAND = 2 |
| 00 | 00 | 01 | 2C | |
| 00 | 00 | 15 | 83 | |
| 14 | 00 | 00 | 00 | |
| 41 | 42 | 43 | 44 | |
| 45 | 46 | 47 | 48 | |
| 49 | 4A | 4B | 4C | |
| 4D | 4E | 4F | 50 | |
| 51 | 52 | 53 | 54 | |
| 04 | 08 | 00 | 00 | |
| 2F | 7C | 80 | 87 | |
| 04 | 00 | 00 | 00 | |
| 55 | 56 | 57 | 58 | |
| 04 | 08 | 00 | 00 | ← FILLED IN WITH LENGTH |
| 2F | 87 | 87 | 87 | ← NEW Requested Address FIELD = 47.135.135.135 |
| 00 | 00 | 00 | 00 | |

NAME RESOLUTION PROTOCOL, SYSTEM AND METHOD FOR RESOLVING A FLAT NAME SPACE TO AN ADDRESS SPACE

FIELD OF THE INVENTION

The invention relates to name resolution protocols, systems and methods for resolving a flat name space, such as the TL1 (Transaction Language 1) name space, to an address space, such as the IP (Internet Protocol) address space.

BACKGROUND OF THE INVENTION

Figure 1:
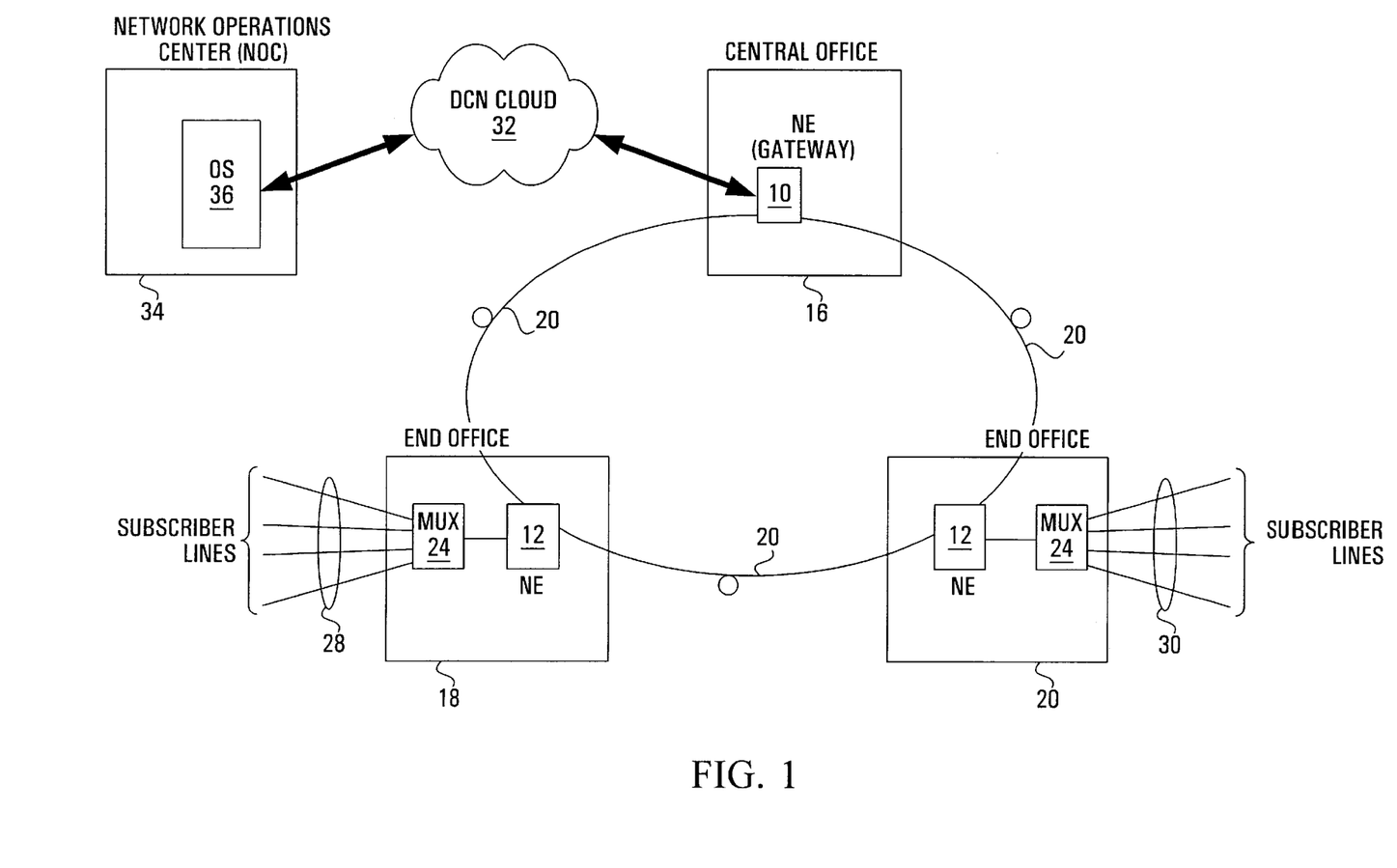
FIG. 1 is a block diagram of a typical system containing a SONET ring configuration.

FIG. 1 is a block diagram of a typical system containing a SONET (synchronous optical network) ring configuration. The system consists of a SONET ring composed of a plurality (three shown) of SONET network elements 10,12, 14, including a gateway SONET network element 10 in a central office 16, and two end office SONET network elements 12,14 in two end offices 18,20, the SONET network elements all being connected by a bi-directional fiber ring 20. Each end office SONET network element 12,14 is connected to a respective subscriber line multiplexing switch/device 24,26, which in turn is connected to subscriber devices (not shown) through respective groups of subscriber lines 28,30. Each SONET network element 10,12,14 performs add/drop multiplexing of SONET frames.

The network element 10 in the central office 16 is shown connected through a DCN (data communications network) cloud 32 to a NOC (network operations centre) 34 running an OS (operations system) 36. Operations staff work in the NOC 34 to perform OAM & P (operations, administration, maintenance and provisioning operations) functions through the operations system 36. The DCN cloud 32 may be any connection of routers/switchers/bridges and/or LAN/WAN links. The communications from the SONET network through the DCN 32 to the NOC 34 are all control communications, not regular traffic, such as voice traffic.

It has become somewhat the defacto standard that operations systems such as OS 36 use TL1 (Transaction Language 1—defined in BellCore Telecordia GR-831-CORE) to communicate with the networks they are being used to manage.

In accordance with TL1, each network element 10,12,14 is aware of its own respective unique SID (system identifier). In TL1, the identification of a network element's SID is specified by a TID (target identifier) in a TL1 command from the OS 36 or in a response from a network element. It is the responsibility of the gateway network element 10 to route TL1 messages from the OS 36 to the appropriate network element based on the TID in each message. The gateway network element 10 communicates with the other network elements 12,14 using an embedded data communication channel, and thus a conversion from TL1 TIDs to the addresses of the embedded data communications channel must be made. Traditional SONET networks have used the OSI (Open Systems Interconnection) protocol suite over this embedded data communications channel, and this TID conversion function was done using TARP, another protocol specified in BellCore Telecordia GR-253-CORE.

Recently, efforts have been made to move away from the OSI protocol suite to use IP as the protocol over the embedded data communications channel. In such networks, the operations systems 36 would still be communicating in TL1, and thus the gateway network element 10 needs to perform address resolution from the TL1 name space to the IP space. The above identified TARP algorithm is an address resolution protocol originally designed to work in OSI networks, not IP networks. In theory, TARP could be adapted to work in an IP network. However, TARP relies on an inefficient packet flooding algorithm.

The Internet name space is hierarchical, with authoritative name servers translating names to IP addresses within that space. Domains can also be further subdivided into subdomains with authoritative servers for those subdomains. A lookup would start with the highest authoritative server (called root), walking through the hierarchy stopping at each authoritative server for each subdomain until the name has been resolved. The Domain Name System (DNS) has traditionally provided the name to IP address lookup functionality. DNS does not work for the TL1 name space because the TL1 name space is flat rather than hierarchical. The DNS root could be configured to understand all TL1 SIDs (system identifiers), but that would not work if the network elements are connected to the Internet because DNS would resolve all addresses to the well known DNS root server and that is where it would stop.

DNS was originally designed to work with static configuration tables which rarely changed. In a SONET network, network elements can be added, removed or may be isolated by fiber failure. While dynamic DNS (IETF RFC 2131) could be used to deal with this issue strictly in the IP domain, dynamic DNS does not solve the problem discussed above wherein SONET network elements are connected to the Internet.

LDAP (Light Weight Directory Access Protocol) is a distributed database that could also be used to solve the problem. This solution does not suffer from the DNS limitations, however it requires extra provisioning in the database records and a LDAP server each time a new network element is added.

Thus, to facilitate the implementation of IP-based SONET networks, it would be advantageous to have an efficient TL1 name to IP address resolution protocol.

SUMMARY OF THE INVENTION

Various embodiments of the invention provide network elements adapted to participate in an inventive name resolution protocol which performs name resolution from a flat name space, such as the TL1 name space, to an address space, such as the IP address space. Advantageously, a very efficient approach is used to resolving the flat name to the addresses which does not require any inefficient packet flooding, and which is adaptive to changes in a network which might occur.

One embodiment provides a network element adapted to implement the functionality by which a name resolution can be requested, i.e. the requesting functionality of the protocol. Such a network element has a first memory element adapted to store one or more local name of the network element, the local name belonging to one or more flat name spaces, and a processing element adapted to process a requested name by determining if the requested name is one of the local names, and if not to send a request message to a group of network addresses in the address space belonging to network elements which have joined the group, the request message containing the requested name for which a corresponding address is required.

The network element may further comprise a second memory element adapted to store previously resolved name-to-address mappings. In such a case, the processing element is adapted to process the requested name by determining if the requested name is one of the local names or a name of a previously resolved name-to-address mapping, and if not to send the request message.

The network element is typically further adapted to process a response messages specifying a particular network address for the requested name, and to add a name-to-address mapping to the second memory element identifying the particular network address as being the network address for the requested name.

The group of addresses might for example be a multicast group of IP addresses. The network element typically is equipped with an interface for receiving a command from an external source such as an operations system, the command specifying the requested name.

Another embodiment provides a network element adapted to perform the reporting functionality, i.e. to respond to requests generated as outlined above. Such a network element has a stack with a local address, and a memory element adapted to store one or more local names of the network element. The network element also has a procedure by which the network element joins a group of addresses, and request message processing functionality adapted to process a request message containing a requested name for which a corresponding address is required by comparing the requested name with the local names, and if there is a match with any one of these, to reply with a response message specifying the local address.

Network elements might be equipped with either or both of the requesting and reporting functionality. The network elements might for example form part of a network in which network elements are connected in an add/drop configuration so as to perform an add/drop multiplexing function on physical layer frames being transmitted on the network.

In embodiments employing the IP hierarchical address space, the network elements have a stack interface between IP packets and physical layer frames which might for example be SONET frames. The stack interface might for example be adapted to insert the IP packets in a channel defined by predetermined byte locations in the physical layer frames. In the event the physical layer frames are SONET frames, such predetermined byte locations might for example be SONET D1 to D12 overhead bytes.

Another embodiment provides a network of network elements each as summarized above, for example a SONET ring of network elements.

Advantageously, the solution does not require an additional provisioning on the network elements, and maintenance is not required when a network element is added to the system.

Further embodiments of the invention also include methods of realizing any of the above functionality, and include computer readable medium containing computer instructions which implement these instructions.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

An embodiment of the invention will now be described in the context of a SONET ring of network elements each having an IP address and in the context of TL1 message commands containing TL1 addresses which need to be resolved to IP addresses.

Figure 2A:
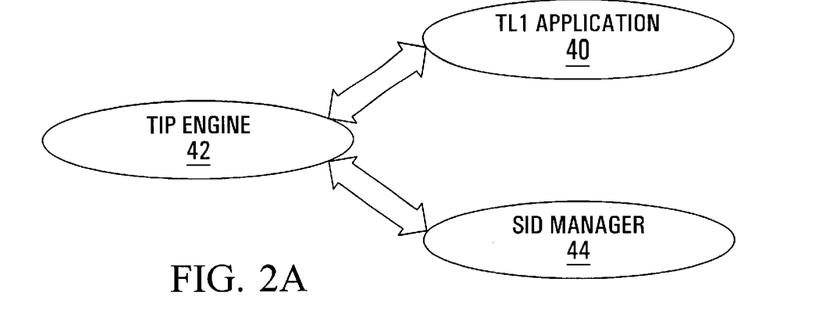
FIG. 2A is a functional diagram of a network element adapted to implement a TL1 to IP address resolution protocol in accordance with an embodiment of the invention.

A functional diagram of a network element adapted to implement an embodiment of the invention is shown in FIG. 2A. Shown are three components, namely a TL1 application 40, a TIP (TL1 to IP) engine 42, and a SID (system identifier) manager 44. The TL1 application 40 is an application on the network element which processes TL1 commands in the event they are addressed to the particular network element, and which forwards the message on to the appropriate network element in the event they are not addressed to the particular network element. The SID manager 44 is simply responsible for maintaining knowledge of the SID for that network element. It is noted that a given network element may have more than one SID (more generally a given network element might have multiple flat names belonging to one or more flat name spaces), and the SID manager 44 would be responsible for maintaining knowledge of each flat name. The TL1 application 40 interfaces with the TIP engine 42 which in turn interfaces with the SID manager 44 to determine the particular network element's SID. The TL1 application 40 makes a request to the TIP engine 42 when it needs to resolve a TID to an IP address. The TIP engine 42 processes such a request in a manner described in detail below with reference to the flow chart of FIG. 3.

When a network element is activated, its initialization procedure initializes and starts the TIP engine 42. The TIP engine 42 defines a multicast group which ultimately includes addresses of all the network elements in the network of which the network element is a part. A multicast group is a class D IP address. Any IP packet addressed to the multicast address is sent to all of the IP routers and hosts that are members of the group. Alternatively, the TIP engine 42 causes the network element to join this multicast group if it is already in existence. More generally, every network element is configured to join the multicast group, for example during initialization, or to create the multicast group if the particular network is the first activated. More generally still, the network elements are included in a group of network addresses. For the purpose of this explanation, this multicast group will be a multicast group having a predetermined name, for example "AllSC" (all shelf controllers) since OAM & P functions are part of the shelf controllers. Each network element is configured to join the AllSC multicast group upon startup. The network elements might join the AllSC multicast group using the IGMP protocol for example. The IGMP is the Internet Group Message Protocol defined in IETF RFC 1112 and IETF RFC 2236.

Each network element has its own SID (maintained for example in a memory element under control of the SID manager) and also maintains a database, table or other suitable structure in another memory element, such as a cache, which maps TIDs to IP addresses for IP connections from the particular network element to another network element in the network, as described in detail below. More generally, there is a mapping of flat names in a flat name space to respective addresses in an address space. For example, a table such as shown in Table 1 below has a first column containing TIDs, and a second column identifying corresponding IP addresses. As TIDs are resolved to IP addresses, this table is expanded to include additional records. The database might for example be a cache of fixed size. This keeps the amount of memory needed small. Entries may be removed when time expires or when no more space exists in the tableland a new entry must be added.

TABLE 1

TID to IP Address Mapping

| TID | IP Address |
|---|---|
| TID_1 | IP_A |
| . | . |
| . | . |
| . | . |
| TID_N | IP_N |

As described below, the TID to IP address mappings are used to reduce the amount of required messaging. If this reduction in messaging is not a priority, the invention could be implemented without maintaining these mappings and by instead sending the multicast message every time the TID does not match the local SID.

Figure 2B:
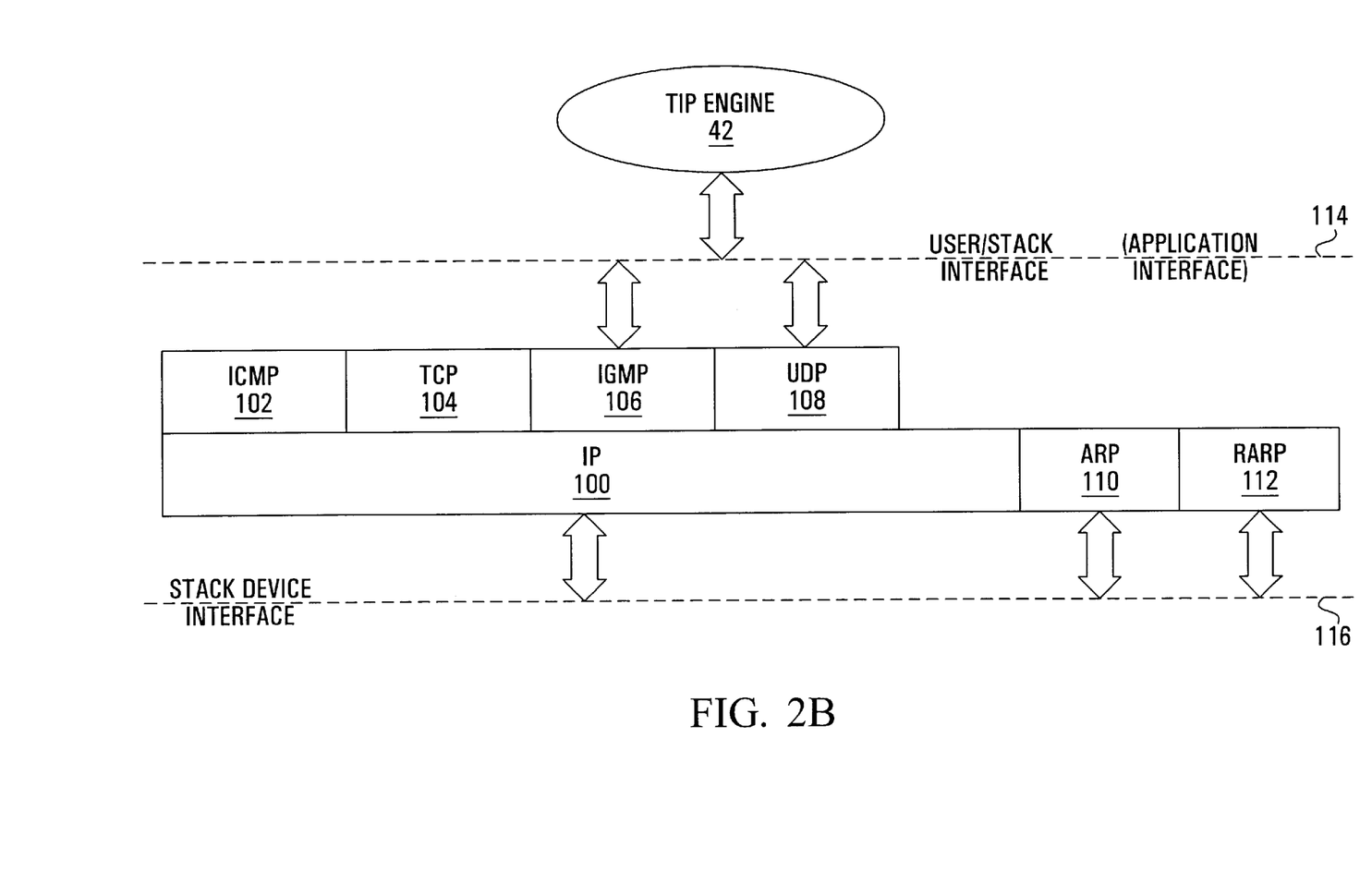
FIG. 2B is an example of stack configurations which might be used with the network element of FIG. 2A.

FIG. 2B illustrates details of the stack interfaces implemented in each network element. An IP stack 100 is shown together with native interface protocols ICMP (Internet Control Message Protocol defined in IETF RFC 792) 102, TCP (Transmission Control Protocol defined in IETF RFC 793) 104, IGMP (Internet Group Message Protocol defined in IETF RFC 1112 and RFC 2236) 106 and UDP (User Datagram Protocol as defined in IETF RFC 768) 108 all running in a layer over IP (Internet Protocol defined in IETF RFC 791) 100. Also shown for completeness are ARP (address resolution protocol defined in IETF RFC 826) 110 and RARP (reverse address resolution protocol defined in IETF RFC 903) 112. Dotted line 114 represents the user application/IP stack interface. As described previously, the TIP engine 42 represents the functionality provided by an embodiment of the invention and this may be run as a user application above the IP layer 100 and interfaces with the stack through the application interface 114. Dotted line 116 represents the IP stack interface to the physical devices which carry traffic between network elements. For a SONET-like network for example, this might include an interface into SONET overhead bytes D1 to D12 in which case bytes are taken form the IP layer and inserted into the bytes D1 to D12. The large arrows are intended to show data flow in the stack.

Figure 2C:
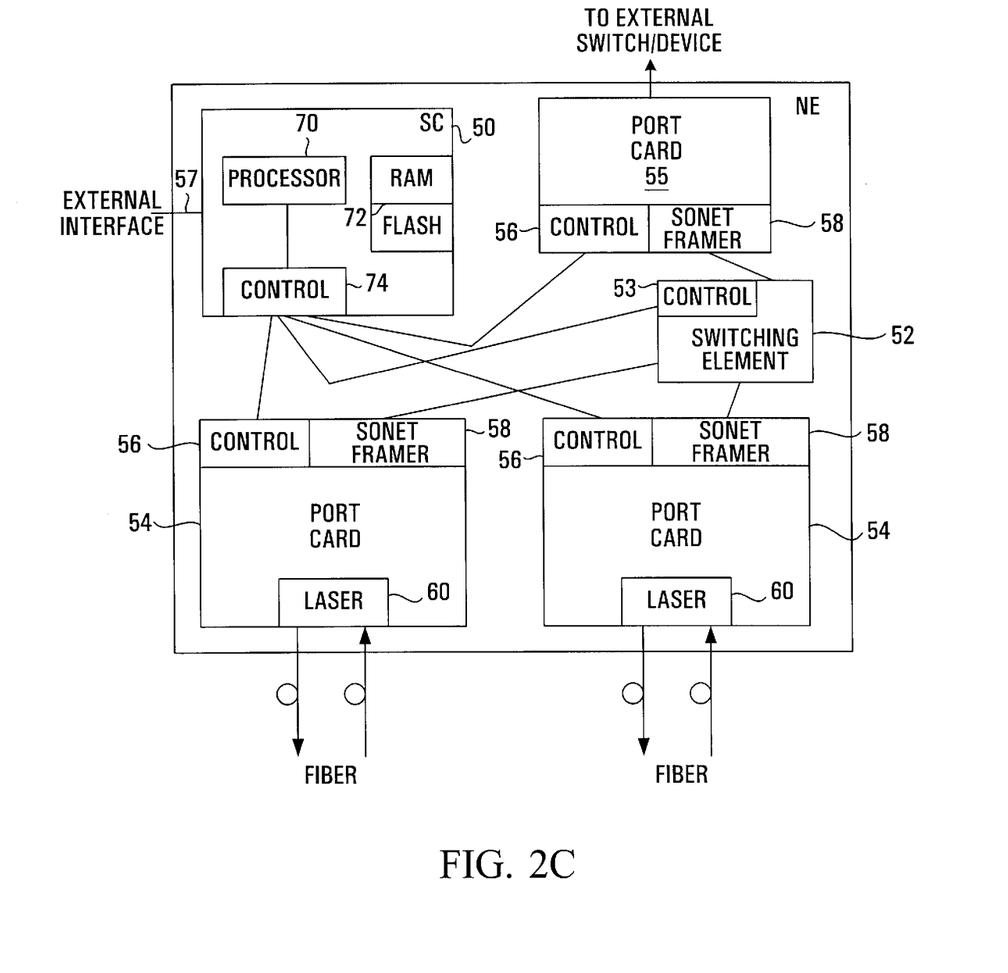
FIG. 2C is a block diagram of the network element of FIG. 2A.

An example internal architecture of a network element is shown in FIG. 2C. Each network element has a shelf controller 50 which is responsible for control functionality in the network element, and has a plurality of port cards 54,55 (three shown). There is a switching element 52 which performs switching of SONET frames between the various port cards 54,55. In the event the network element is a gateway network element, the gateway network element's SC 50 has an external interface 57 to the previously identified connection through the DCN cloud 32 to the NOC 34 (see FIG. 1). The shelf controller 50 has processing and memory capability, for example processor 70, and RAM/flash memory 72, and has a control interface 74 to each of the port cards 54,55 and to a control interface 53 forming part of the switching element 52. One of the port cards 55 is for connection to the external subscriber line multiplexing switch/device (for example device 24 of FIG. 1) to which subscriber lines may be connected. The switching element 52 consists of any mechanism for switching SONET frames between port cards 54,55. The switching element 52 interfaces with each port card 54,55 through a respective SONET framer 58 which in turn produces an output in the format required by the port, this being SONET frames for port cards 54 which are each connected to a respective laser 60 to the fiber ring. Some other format may be required by the external switch/device, and port card 55 would perform this conversion. Similarly, SONET frames received from the fiber ring may be passed to switching element 52 and on to the appropriate subscriber device through the subscriber lines. Port cards may also be provided for interfacing to other networks.

The IP stack defined above with respect to FIG. 2C would typically be implemented in the processor 70 in the shelf controller 50. Similarly, the processor 79 would typically implement the TIP engine, TL1 application and SID manager of FIG. 2A. These applications may be combined as a single application or partitioned into separate applications. They may be implemented in software, processor hardware such as an ASIC, FPGA, and/or/be delivered in a computer readable medium such as a disk, tape etc. IP packets would go through control interfaces 74,56 to be delivered to/from the appropriate port cards where they are inserted into/read from SONET overhead bytes D1 to D12 by the appropriate SONET framer 58.

The TL1 name to IP address resolution protocol provided by this embodiment of the invention can be divided into request functionality which is implemented by a network element receiving the TL1 message for distribution (usually a gateway network element), and report functionality implemented by each network element in response to requests from the request functionality. Typically, each network element is equipped with a TIP engine providing both the request and report functionality. However, for network elements which have no interface for receiving or generating TL1 commands, the request functionality becomes optional, and the TIP engine might only include report functionality.

Figure 3:
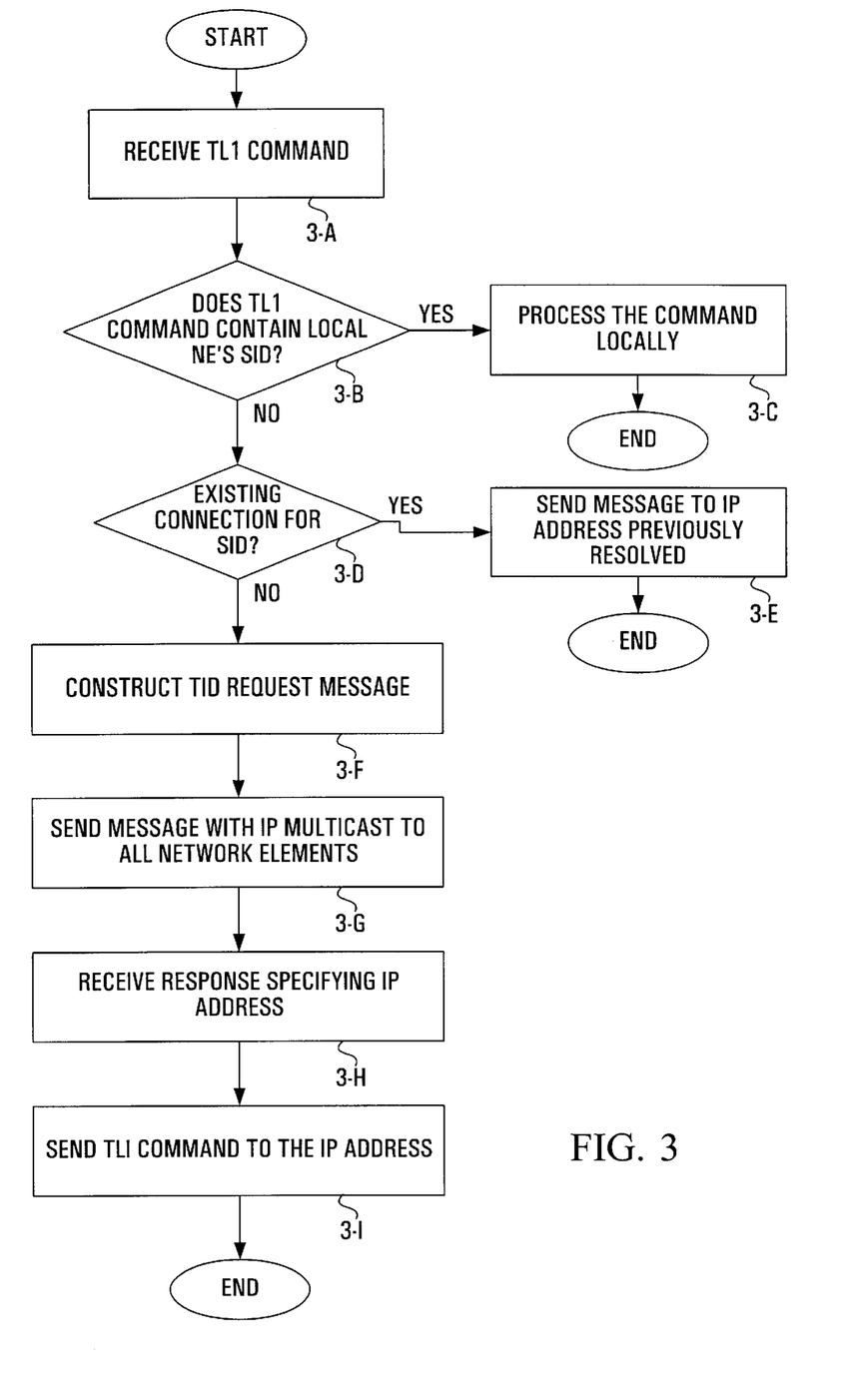
FIG. 3 is a flowchart of the steps performed by a gateway network element in requesting an IP address matching a TID in accordance with an embodiment of the invention.

A method of performing a TL1 to IP address resolution request functionality provided by an embodiment of the invention will be described with reference to the flowchart of FIG. 3. This method might be implemented by the gateway network element 10 of FIG. 1 for example.

The method is initiated upon receipt at the gateway network element 10 of a TL1 command (step 3-A). Each TL1 command contains a TID. More specifically each TL1 command has the following format {<command>:TID:AID:CTAG:<parameters>} where <command> specifies a particular command for the message, TID is the target identifier, AID is the access identifier identifying a facility on the target, and CTAG is a correlation tag to allow messages and responses to be matched up. There may be additional parameters. The TL1 application 40 examines the TID (step 3-B), and if the TL1 command contains the TID which matches the SID of the gateway network element (the local NE) as specified by the SID manager 44 then the message is processed by the gateway network element (step 3-C). The details of actual processing of the messages by the network elements to which they are addressed is outside the scope of this invention. Otherwise, the TIP engine 42 is asked to determine the IP address which matches the TID. In the event the TID does not match the SID of the gateway network element, the TIP engine looks up in its cache (for example in the format of Table 1 above) to determine whether there is an existing record for the TID or not (step 3-D). In the event the TID is in the cache, the address has been previously resolved and the message is sent to the IP address for that TID (step 3-E). In the event it is determined that the TID is not in the cache, a TID request message is constructed.

Figure 5A:
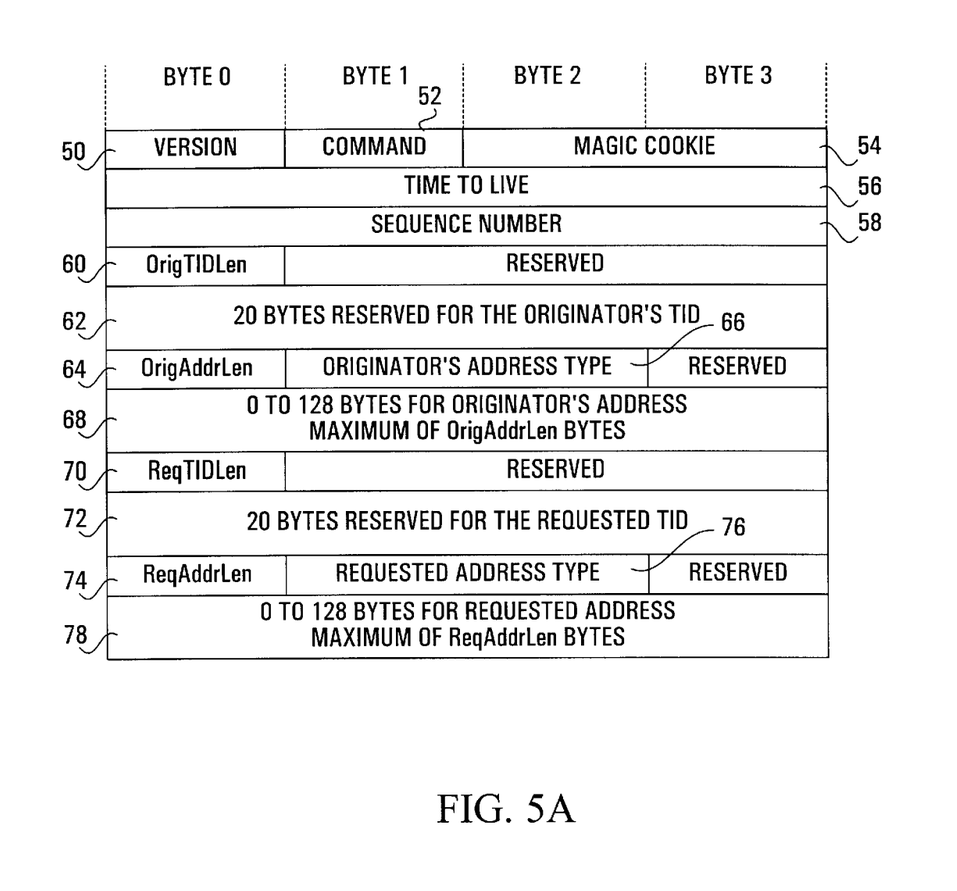
FIG. 5A contains details of an example protocol format.

An example format of the TIP messages is shown in FIG. 5A. As indicated above, there are two basic functions supported by this protocol. The first is the request functionality which requests the IP address for a given TID (or simply request), and the second is to report the IP address of a given TID. (or simply report). The protocol uses a port which might be predetermined and/or configurable. For example, the UDP port might be pre-configured to UDP port number 20862. A TIP message is built as a PDU (protocol data unit) and is sent in network byte order in the dataportion of an IP packet. In this embodiment the IP packets are sent in SONET overhead bytes D1 to D12. The message optionally includes a version number 50 which is a version of the address resolution protocol. There is a command field 52 which identifies the message as a request or a report. For example, "1" might indicate "request", and "2" might indicate "report". There is optionally one or more sanity fields, for example a "magic cookie" field 54. There may be a "time to live field" 56 (representing a period in seconds that the data is valid) and a sequence number field 58 (incremented each time a new request is sent). There is an originator's TID length field OrigTIDLen 60 identifying the number of bytes in the originator's TID field that are valid, and this field is followed by the originator's TID 62. The TID length field 60 might be for example from 0 to 20. There is a field for the originator's address length OrigAddrLen 64 again indicating the number of bytes of the originator's address which are significant. This is followed by an originator's address type field 66. The type of address might for example be interpreted in accordance with the ETHER TYPES defined in RFC 1700. In the event IPv6 address type is used, the type is defined in RFC 2464 as 86DD hex. There is a field 68 for the originator's address which is used to store the IP address of the originator (the gateway network element's IP address). This is the IP address where the response to this message is to be sent. The requested TID length ReqTIDLen 70 is the maximum number of bytes that are significant in the requested TID field 72. This might for example be constrained to the range 1 to 20. The requested TID field 72 is for storing the TID of the entity being searched for. The requested address length ReqAddrLen 74 is the number of bytes in the requested address field which are significant. The requested address type 76 is the type of the address. The Requested IP address field 78 is for containing the IP address matching the requested TID.

Figure 5B:
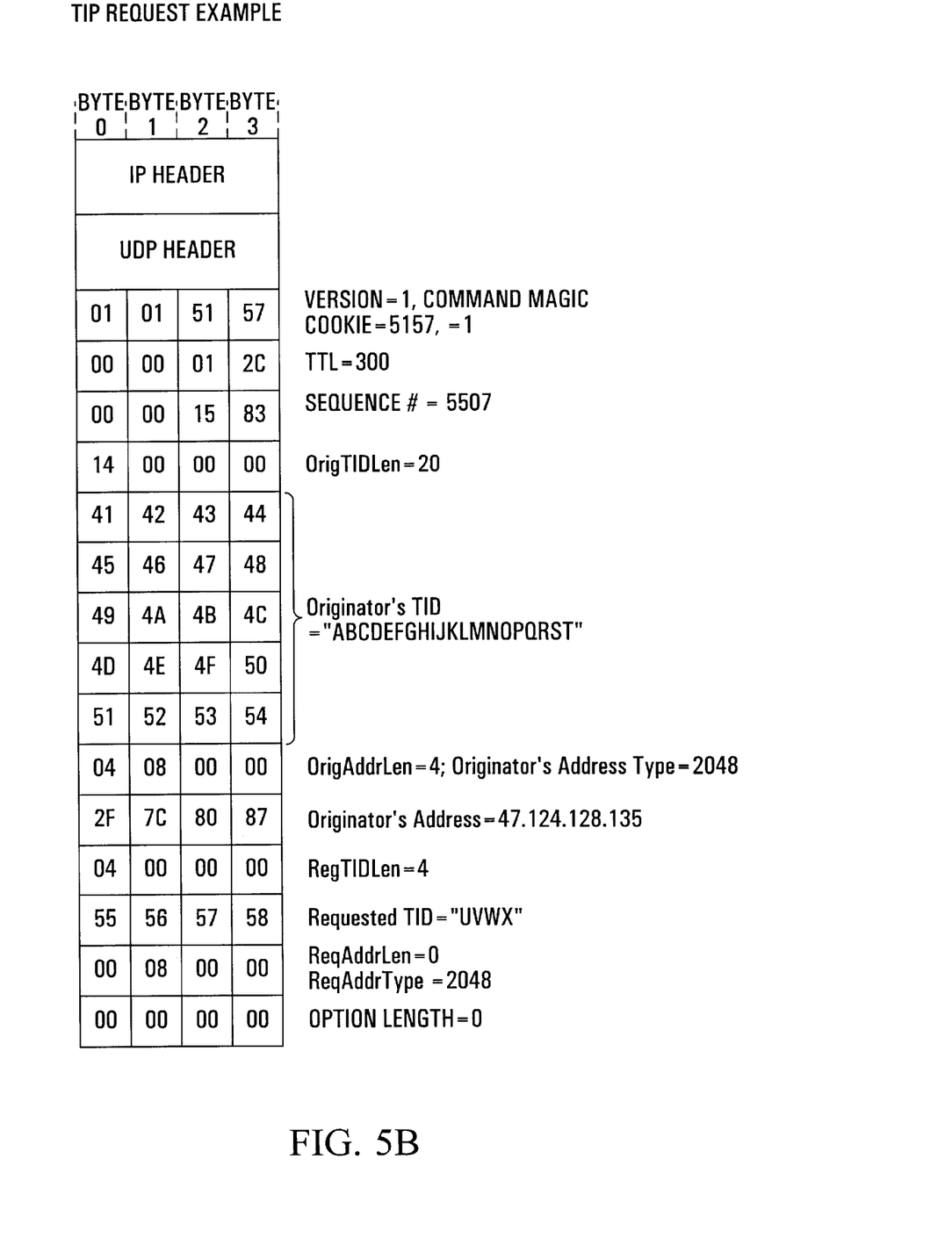
FIG. 5B is an example request message using the protocol format of FIG. 5A.

An example request message is shown in FIG. 5B.

Figure 4:
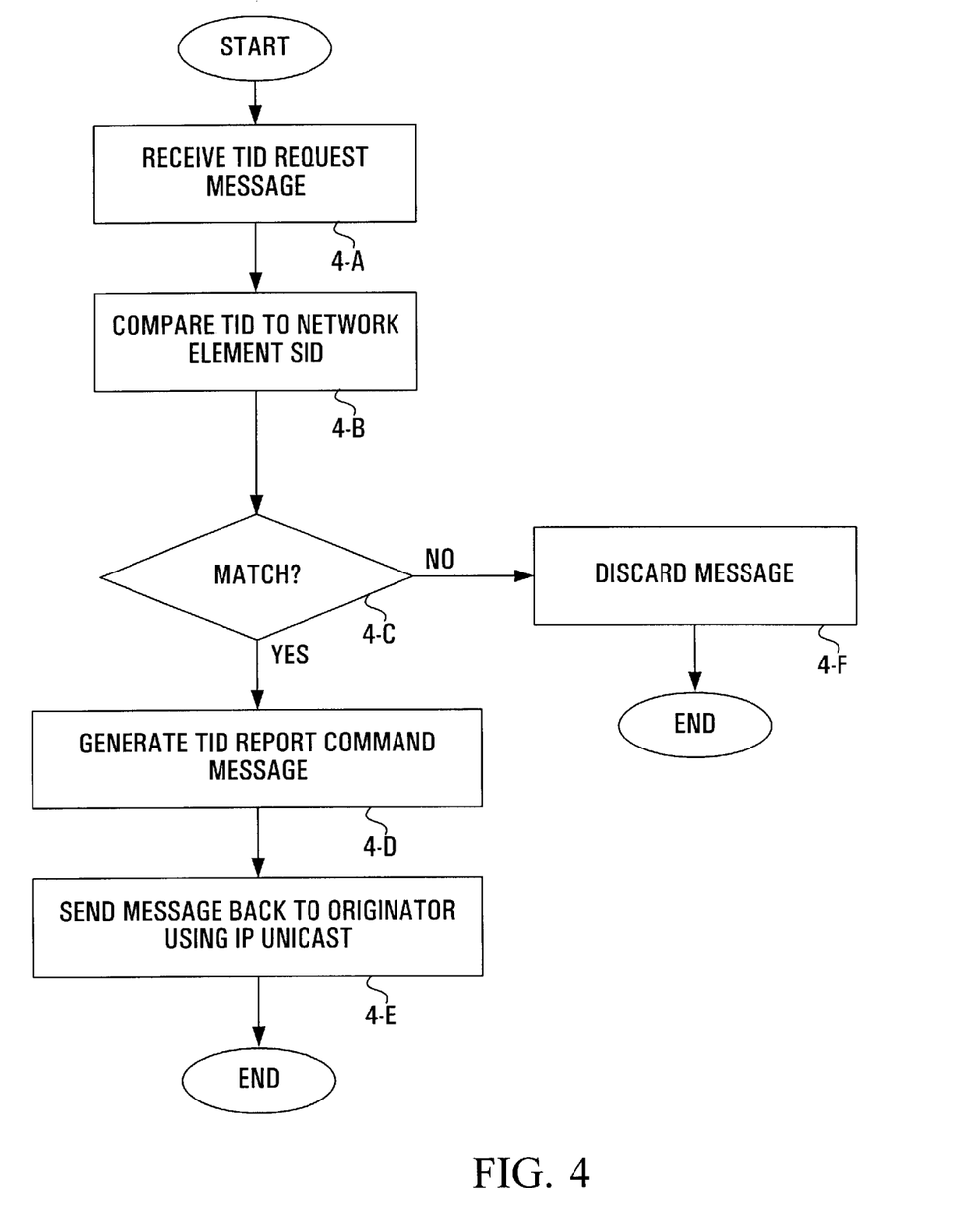
FIG. 4 is a flowchart of steps executed by a network element in responding to a request for an IP address matching a TID.

Returning now to FIG. 3 and with reference to FIGS. 2A and 2B, a TID request message is constructed (step 3-F), the version 50, Command 52 (=request), magic cookie 54, originator's TID length 60, originator's TID 62, originator's address length 64 and type 66, originator's IP address 68, Requested TID length 70 and Requested TID fields 72 are all filled in. This message is then handed off to the application interface 114 which in turn hands it to UDP 108 which adds a UDP header and sends it on to the IP layer 100. The IP layer 100 then adds its header, setting in the destination IP address as the AllSC multicast address and hands the packet off to the device drivers through the stack device interface 116. The device drivers then send the packet off out over the physical interfaces. The result is that the packet is sent around to all the network elements in the network using IP multicast (step 3-G). Every network element that is a member of the multicast group receives the request. IP multicast attempts to deliver packets but does not guarantee delivery. The request might be retransmitted a number of times in the event a response message is not received, for example three times with a reconfigurable delay between retransmissions, for example 30 seconds. The IP time to live value 56 will determine when the PDU will die. In response, one of the network elements will respond with an IP unicast message to the originator's IP address by returning the request message with the requested IP address filled in. Details of how the network elements process the multicast message are provided below with reference to FIG. 4. Upon receipt of the response (step 3-H), the unicast message is sent up the stack and finally delivered to the TIP engine 42 and finally the TL1 application 40. The TIP engine 42 updates its cache to include the newly resolved TL1 address—IP address pair. The gateway network element can then send the TL1 command on to the IP address thus identified (step 3-I).

Figure 5C:
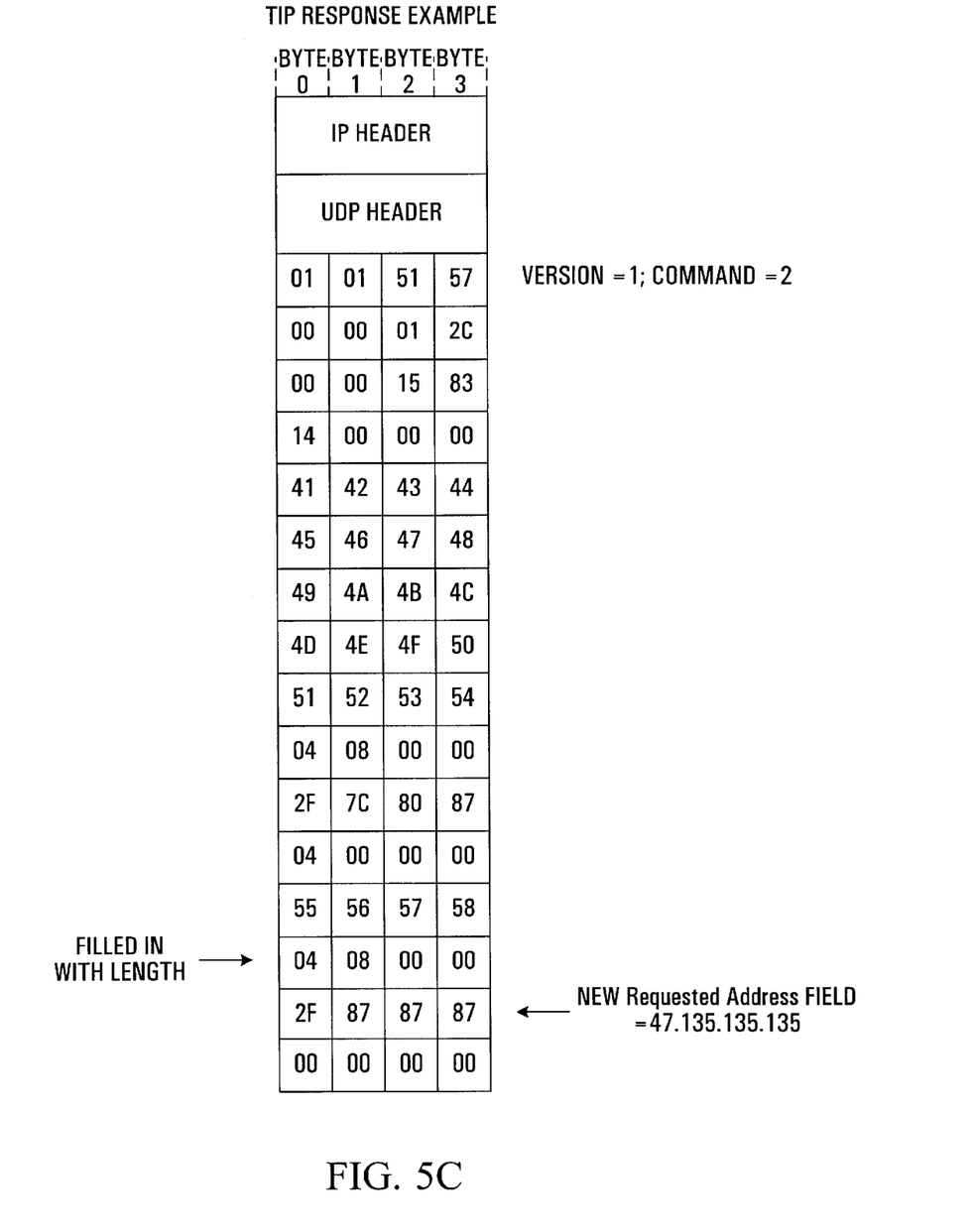
FIG. 5C is an example response message using the protocol format of FIG. 5A.

An example of a TID response message is shown in FIG. 5C corresponding with the request message of FIG. 5B. The report functionality which processes the above-introduced multicast messages in the network elements of the multicast group will now be described with reference to FIG. 4. Upon receipt of such a request message (step 4-A), the network element sends the packet up the stack, stripping the IP and UDP headers, and finally the packet arrives at the application interface 114. From the application interface the packet is sent to the TIP engine 42 which queries the SID manager 44 to see if there is a match between the requested TID and the network element's SID (more generally any one of the network element's SIDs). More specifically, (step 4-B) the TIP engine 42 looks at the version number 50, magic cookie 52, and TID 72 to determine if there is a match between all three of these fields and local values. In the event there is a match (Yes path, step 4-C), the network element generates a report command message (step 4-D). Most of the fields in the report command are copied from those fields in the received request command. The Requested IP address field 78 of the report address is filled in with the IP address of that network element. This packet is then sent through the stack which adds the UDP and IP headers with IP unicast to the originator's IP address thereby completing the processing of the message (step 4-E). In the event there is no match (No path, step 4-C), the message is discarded without further processing (step 4-F).

It is noted that a given network element may in some circumstances have more than one IP address. In such a network element, preferably only one of the IP addresses is selected upon configuration to be in the multicast group. In the event the network element also has multiple SIDs, it is possible to always respond to a request relating to any of the SIDs with a common IP address. Alternatively, it is possible to respond to a request relating to a particular one of the SIDs with a particular one of the multiple IP addresses.

It is noted that in most implementations, the network element itself contains the routing software, therefore the initial IGMP will be internal to the network element. Multicastextensions to OSPF (called MOSPF) is the preferred method for TIP. Since TIP is an application protocol, it does not matter which multicast approach is chosen. TIP will work with PIM Sparse, CBT, DVMRP, or PIM Dense, for example.

Figure 6:
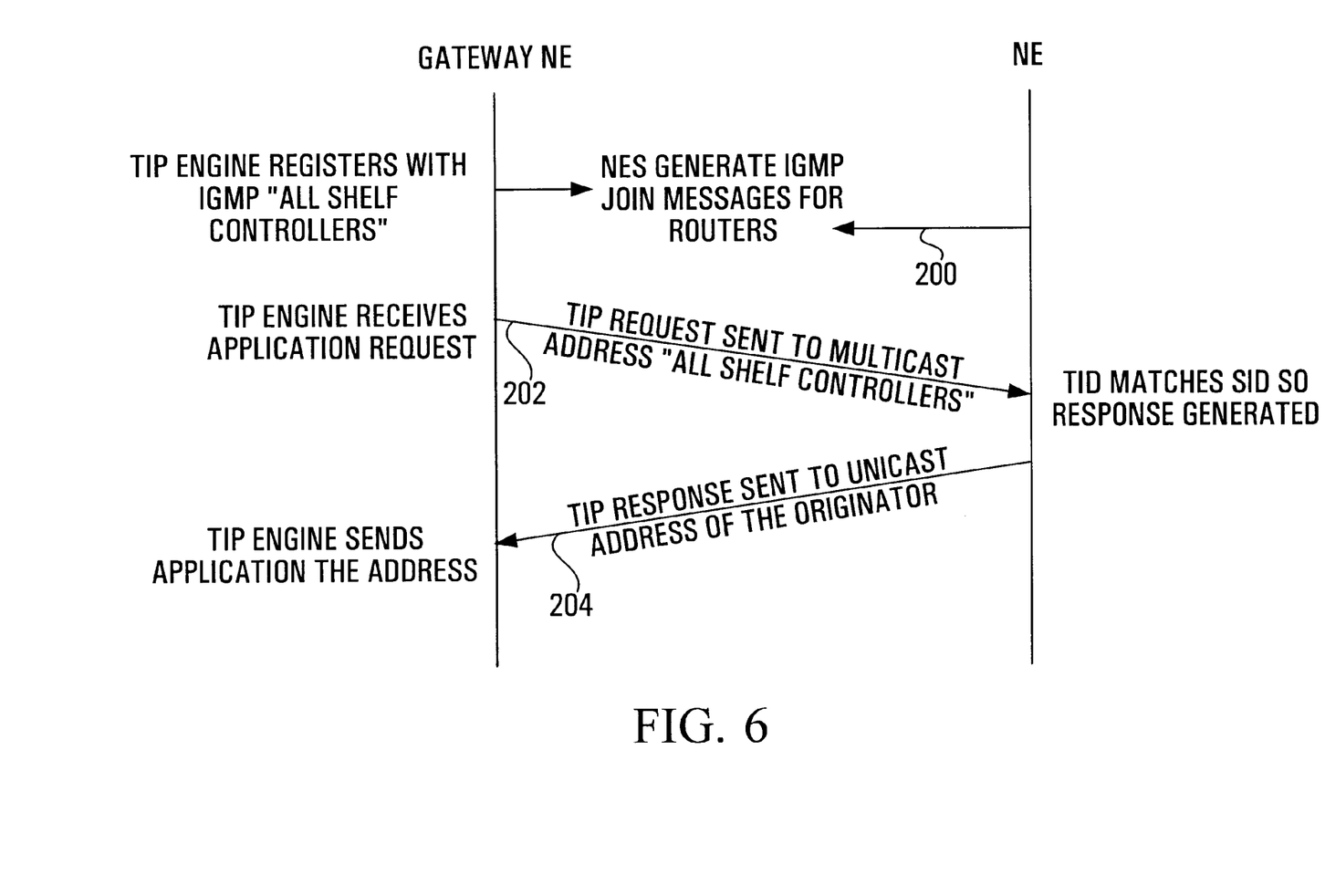
FIG. 6 is a summary of the message exchange used to perform the TL1 to IP address resolution protocol in accordance with an embodiment of the invention.

FIG. 6 summarizes the interaction between the above discussed request functionality and report functionality. To begin, all network elements including gateway network elements and regular end office network elements join the multicast group through an IGMP message 200. Next, after a TIP engine for example running on the gateway network element, receives a request, it generates a TID request message 202 and sends this to all network elements through IP multicast. Each network element receiving the TIP request examines the TID and determines if it matches the locally stored SID. If there is a match, a TID response message 204 is generated and sent by IP unicast back to the engine which originated the request.

Numerous modifications and variations of the present invention are possible in light of the above teachings. It is therefore to be understood that within the scope of the appended claims, the invention may be practised otherwise than as specifically described herein.

For example, while an embodiment of the invention has used the TL1 address space, more generally any name space may be used. While the invention has used the IP address space, more generally any address space may be used.

Where an example has been described in the context of SONET network elements, for the purpose of this description a network element is any component having a flat name which needs to be resolved, for example routers, hosts, switches etc.

We claim:

1. A network element adapted to perform address resolution from a flat name space to an address space, the network element comprising:

a first memory element adapted to store at least one local name of the network element, each local name belonging to a respective flat name space;

a processing element adapted to process a requested name by determining if the requested name is one of the at least one local names, and if not to send a request message to a group of network addresses in the address space belonging to network elements which have joined the group, the request message containing the requested name for which a corresponding address is required.

2. A network element according to claim 1 further comprising a second memory element adapted to store previously resolved name-to-address mappings;

wherein the processing element is adapted to process the requested name by determining if the requested name is one of the at least one local names or a name of a previously resolved name-to-address mapping, and if not to send the request message.

3. A network element according to claim 2 further adapted to receive a response message specifying a particular network address for the requested name, and to add a name-to-address mapping to the second memory element identifying the particular network address as being the network address for the requested name.

4. A network element according to claim 2 further comprising:

a third memory element adapted to store a local address;

a procedure by which the network element joins the group of network addresses;

a request message processing element adapted to process a received request message containing a requested name for which a corresponding address is required by comparing the requested name with the at least one local name, and if there is a match with any one of the at least one local name, to reply with a response message specifying the local address.

5. A network element according to claim 1 wherein at least one flat name space is a TL1 (transaction language 1) name space.

6. A network element according to claim 1 wherein the address space is an IP (Internet Protocol) address space.

7. A network element according to claim 6 wherein the group of network addresses is a multicast group of IP addresses.

8. A network element according to claim 1 further comprising:

an interface for receiving a command from an external source, the command specifying the requested name.

9. A network element according to claim 1 further comprising:

a second memory element adapted to store a local address;

a procedure by which the network element joins the group of network addresses;

a request message processing element adapted to process a received request message containing a requested name for which a corresponding address is required by comparing the requested name with the at least one local name, and if there is a match with any one of the at least one local name, to reply with a response message specifying the local address.

10. A network element adapted to perform address resolution from a TL1 address space to an IP address space, the network element comprising:

a first memory element adapted to store a local TL1 SID (system identifier) of the network element;

a second memory element adapted to store previously resolved TL1 TID (target identifier)-to-IP address mappings;

a TL1 message processing element adapted to process a requested TL1 TID by determining if the requested TL1 TID is the local TL1 SID, or a TL1 TID of a previously resolved TL1 TID-to-IP address mapping, and if not to send a request message IP packet to a multicast address of a multicast group containing IP addresses of all network elements which have joined the multicast group, the request message containing the requested TL1 TID for which a corresponding IP address is required.

11. A network element according to claim 10 further adapted to receive a response message specifying a particular IP address for the requested TL1 TID, and to add a TL1 TID-to-IP address mapping to the second memory element identifying the particular IP address as being the network address for the requested TL1 TID.

12. A network element according to claim 11 further comprising:

a procedure run to define the multicast group if not already in existence.

13. A network element according to claim 10 further comprising:
an interface for receiving a TL1 command from an external source, the TL1 command specifying the requested TL1 TID.

14. A network element according to claim 10 adapted to be connected to a network in an add/drop configuration so as to perform an add/drop multiplexing function on physical layer frames being transmitted on the network.

15. A network element according to claim 10 adapted to have a stack interface between IP packets and physical layer frames.

16. A network element according to claim 15 wherein the stack interface is adapted to insert the IP packets in a channel defined by predetermined byte locations in the physical layer frames.

17. A network element according to claim 15 wherein the physical layer frames are SONET frames.

18. A network element according to claim 15 wherein the physical layer frames are SONET frames and the predetermined byte locations are SONET D1 to D12 overhead bytes.

19. A network element according to claim 10 which is a SONET network element.

20. A network element according to claim 10 further comprising:
an IP stack with a local IP address;
a procedure by which the network element joins the multicast group having the multicast address;
a TID request message processing element adapted to process a received request message received through the multicast address containing a requested TL1 TID for which a corresponding IP address is required by comparing the requested TL1 TID with the local TL1 SID, and if there is a match, to reply with a response message sent by IP unicast specifying the local IP address.

21. A network element adapted to perform address resolution from a flat name space to a network address space, the network element comprising:
a stack with a local network address belonging to the address space;
a memory element adapted to store a local name of the network element, the local name belonging to the flat name space;
a procedure by which the network element joins a group of addresses;
a request message processing element adapted to process a request message sent to the group of network addresses containing a requested name for which a corresponding address is required by comparing the requested name with the local name, and if there is a match, to reply with a response message specifying the local network address.

22. A network element according to claim 21 wherein the name space is a TL1 (Transaction Language 1) name space.

23. A network element according to claim 21 wherein the address space is an IP address space.

24. A network element according to claim 21 wherein the group of network addresses is a multicast group of IP addresses.

25. A network comprising:
a plurality of network elements according to claim 21 connected together, the network being adapted to provide a channel for control packet transmission between network elements of the network on the basis of the respective local addresses;
an interface for receiving a command addressed to a target name;
a name resolution protocol function adapted to determine a network address corresponding with the target name by sending a request message to all network elements in the network asking each network element if their local name matches the target name, and by receiving a response message from the network element whose name matches the target name specifying the address corresponding with the target name.

26. A network according to claim 25:
wherein the network is a SONET ring, with each network element performing an add/drop multiplexing function on SONET frames on the ring.

27. A network according to claim 25 wherein each name is a TL1 TID.

28. A network according to claim 25 wherein each address is an IP address and the request message is sent by IP multicast.

29. A network according to claim 25 wherein the channel for packet transmission comprises overhead bytes in SONET frames.

30. A network element adapted to perform address resolution from a TL1 TID to an IP address, the network element comprising:
an IP stack with a local IP address;
a memory element adapted to store a local TL1 SID of the network element;
a procedure by which the network element joins a multicast group having a multicast address;
a TID request message processing element adapted to process a request message received through the multicast address containing a requested TL1 TID for which a corresponding IP address is required by comparing the requested TL1 TID with the local TL1 SID, and if there is a match, to reply with a response message sent by IP unicast specifying the local IP address.

31. A network element according to claim 30 further comprising: a procedure run to define the multicast group if not already in existence.

32. A network element according to claim 30 adapted to be connected to a network in an add/drop configuration so as to perform an add/drop multiplexing function on physical layer frames being transmitted on the network.

33. A network element according to claim 32 adapted to have a stack interface between IP packets and physical layer frames.

34. A network element according to claim 33 wherein the stack interface is adapted to insert the DP packets in a channel defined by predetermined byte locations in the physical layer frames.

35. A network element according to claim 33 wherein the physical layer frames are SONET frames.

36. A network element according to claim 34 wherein the physical layer frames are SONET frames and the predetermined byte locations are SONET D1 to D12 overhead bytes.

37. A network element according to claim 30 which is a SONET network element.

38. A method for performing address resolution from a flat name space to an address space, the method comprising:
storing a local name belonging to said flat name space;
maintaining a plurality of previously resolved name-to-address mappings;
processing a requested name belonging to the flat name space by determining if the requested name is the local name or a name of a previously resolved name-to-address mapping, and if not to sending a request message to a group of network addresses in said address space belonging to network elements which have joined the group, the request message containing the requested name for which a corresponding address is required;

receiving a response specifying a particular network address for the requested name, and to adding a name-to-address mapping to the plurality of name-to-address mappings identifying the particular network address as being the network address for the requested name.

39. A method according to claim 38 wherein the flat name space is a TL1 (transaction language 1) name space.

40. A method according to claim 38 wherein the address space is an IP (Internet Protocol) address space.

41. A method according to claim 38 wherein the group of network addresses is a multicast group of IP addresses.

42. A method of responding to a request message generated according to claim 38 comprising:

maintaining another local name and a local address;

comparing the requested name with the another local name, and if there is a match, replying with a response message specifing the local address.

43. A computer readable medium containing computer implementable instructions which implement the method of claim 38.

44. A computer readable medium containing computer implementable instructions which implement the method of claim 42.

45. A network comprising a plurality of network elements of claim 1.

46. A network comprising a plurality of network elements of claim 11.

* * * * *